United States Patent
Nielsen et al.

(10) Patent No.: US 8,002,166 B2
(45) Date of Patent: Aug. 23, 2011

(54) METHOD OF PRODUCING METAL TO GLASS, METAL TO METAL OR METAL TO CERAMIC CONNECTIONS

(75) Inventors: Karsten Agersted Nielsen, Roskilde (DK); Mette Solvang, Roskilde (DK); Peter Halvor Larsen, Roskilde (DK)

(73) Assignee: Technical University of Denmark, Kgs. Lungby (DK)

( * ) Notice: Subject to any disclaimer, the term of this patent is extended or adjusted under 35 U.S.C. 154(b) by 875 days.

(21) Appl. No.: 11/813,074

(22) PCT Filed: Dec. 23, 2005

(86) PCT No.: PCT/EP2005/013968
§ 371 (c)(1),
(2), (4) Date: Oct. 3, 2007

(87) PCT Pub. No.: WO2006/069753
PCT Pub. Date: Jul. 6, 2006

(65) Prior Publication Data
US 2008/0142148 A1   Jun. 19, 2008

(30) Foreign Application Priority Data
Dec. 28, 2004   (DK) .................................. 2004 02011

(51) Int. Cl.
*B23K 31/02*   (2006.01)
(52) U.S. Cl. ..................................... 228/122.1; 228/254
(58) Field of Classification Search .................. None
See application file for complete search history.

(56) References Cited

U.S. PATENT DOCUMENTS

| | | | |
|---|---|---|---|
| 3,023,492 A * | 3/1962 | Bristow | 428/552 |
| 4,209,147 A | 6/1980 | Jones, Jr. | |
| 4,702,971 A | 10/1987 | Isenberg | |
| 4,957,673 A | 9/1990 | Schroeder et al. | |
| 5,021,304 A | 6/1991 | Ruka et al. | |
| 5,058,799 A * | 10/1991 | Zsamboky | 228/124.1 |
| 5,064,734 A | 11/1991 | Nazmy et al. | |
| 5,162,167 A * | 11/1992 | Minh et al. | 429/30 |

(Continued)

FOREIGN PATENT DOCUMENTS

CA   2440288   3/2004

(Continued)

OTHER PUBLICATIONS

European Patent Office Search Report for European Application No. 062024339 dated Feb. 2, 2007 (2 pages).

(Continued)

*Primary Examiner* — Kiley Stoner
(74) *Attorney, Agent, or Firm* — Michael Best & Friedrich LLP

(57) ABSTRACT

A method of manufacturing metal to glass, metal to metal and metal to ceramic connections to be used in SOFC applications, said connections being produced as a mixture of a base glass powder and a metal oxide powder. As a result, the inherent properties of the glass used in the composite seals may be altered locally in the metal-coating interface by adding e.g. MgO in order to control the viscosity and wetting, and at the same time maintain the bulk properties such as high coefficient of thermal expansion of the basic glass towards the seal components.

16 Claims, 2 Drawing Sheets

U.S. PATENT DOCUMENTS

Figure 1:
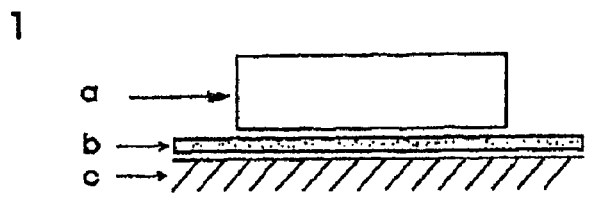

| | | | |
|---|---|---|---|
| 5,358,735 A | 10/1994 | Kawasaki et al. | |
| 5,368,951 A | 11/1994 | Shiratori et al. | |
| 5,670,270 A | 9/1997 | Wallin et al. | |
| 5,702,837 A * | 12/1997 | Xue | 429/40 |
| 5,788,788 A | 8/1998 | Minh | |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin | |
| 6,048,636 A | 4/2000 | Naoumidis et al. | |
| 6,099,985 A | 8/2000 | Elangovan et al. | |
| 6,232,009 B1 | 5/2001 | Batawi | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,479,183 B2 | 11/2002 | Tsukuda et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,843,960 B2 | 1/2005 | Krumpelt et al. | |
| 6,844,099 B1 | 1/2005 | Gorte et al. | |
| 6,878,651 B2 * | 4/2005 | Crosbie | 501/5 |
| 6,936,217 B2 | 8/2005 | Quadadakkers et al. | |
| 6,958,196 B2 | 10/2005 | Gorte et al. | |
| 7,351,488 B2 | 4/2008 | Visco et al. | |
| 2001/0029231 A1 | 10/2001 | Gorte et al. | |
| 2002/0045090 A1 | 4/2002 | Oyanagi et al. | |
| 2002/0048699 A1 | 4/2002 | Steele et al. | |
| 2002/0122967 A1 | 9/2002 | Gorina et al. | |
| 2002/0127455 A1 | 9/2002 | Pham et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0040420 A1 * | 2/2003 | Larsen et al. | 501/15 |
| 2003/0059335 A1 | 3/2003 | Quadadakkers et al. | |
| 2003/0059668 A1 | 3/2003 | Visco et al. | |
| 2003/0082434 A1 | 5/2003 | Wang et al. | |
| 2003/0134171 A1 | 7/2003 | Sarkar et al. | |
| 2003/0145525 A1 * | 8/2003 | Rosenflanz | 51/307 |
| 2003/0165726 A1 | 9/2003 | Robert et al. | |
| 2003/0178307 A1 | 9/2003 | Sarkar | |
| 2003/0186101 A1 | 10/2003 | Christansen et al. | |
| 2003/0224234 A1 | 12/2003 | Steele et al. | |
| 2003/0231973 A1 | 12/2003 | Krumpelt et al. | |
| 2003/0232230 A1 | 12/2003 | Carter et al. | |
| 2003/0235752 A1 | 12/2003 | England et al. | |
| 2004/0033405 A1 | 2/2004 | Barnett et al. | |
| 2004/0043269 A1 | 3/2004 | Taniguchi et al. | |
| 2004/0053101 A1 | 3/2004 | Chartier et al. | |
| 2004/0060967 A1 | 4/2004 | Yang et al. | |
| 2004/0115503 A1 | 6/2004 | Jacobson et al. | |
| 2004/0169064 A1 * | 9/2004 | Rinne et al. | 228/194 |
| 2004/0173666 A1 * | 9/2004 | Fukunaga et al. | 228/202 |
| 2004/0183055 A1 | 9/2004 | Chartier et al. | |
| 2004/0209147 A1 | 10/2004 | Finkenwirth et al. | |
| 2005/0064220 A1 | 3/2005 | Hasz | |
| 2005/0089739 A1 | 4/2005 | Seccombe et al. | |
| 2005/0181253 A1 | 8/2005 | Finnerty et al. | |
| 2006/0024547 A1 | 2/2006 | Waldbillig et al. | |
| 2006/0147782 A1 * | 7/2006 | Reisdorf et al. | 429/34 |
| 2006/0257703 A1 * | 11/2006 | Qi et al. | 429/30 |
| 2006/0280998 A1 * | 12/2006 | Ying et al. | 429/40 |
| 2007/0040003 A1 * | 2/2007 | Rinne et al. | 228/101 |
| 2007/0269701 A1 | 11/2007 | Larsen et al. | |
| 2008/0096079 A1 | 4/2008 | Linderoth et al. | |
| 2008/0118635 A1 | 5/2008 | Larsen | |
| 2008/0124602 A1 | 5/2008 | Larsen et al. | |
| 2008/0166618 A1 | 7/2008 | Larsen et al. | |

FOREIGN PATENT DOCUMENTS

| | | |
|---|---|---|
| CA | 2596173 | 8/2006 |
| CN | 1409427 | 4/2003 |
| CN | 1997229 | 7/2007 |
| DE | 4237602 | 5/1994 |
| DE | 19650704 A1 | 6/1998 |
| DE | 19710345 C1 | 1/1999 |
| DE | 19836132 | 2/2000 |
| EP | 0446680 A1 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| GB | 1313795 | 4/1973 |
| GB | 2400723 | 10/2004 |
| JP | 02-019406 | 1/1990 |
| JP | 9-274921 | 10/1997 |
| JP | 2001335388 | 12/2001 |
| JP | 2003-528979 | 9/2003 |
| JP | 2003-282068 | 10/2003 |
| JP | 2004152585 | 5/2004 |
| JP | 2004319286 | 11/2004 |
| KR | 10-0464607 | 1/2005 |
| WO | WO 92/15122 | 9/1992 |
| WO | WO 98/49738 | 11/1998 |
| WO | WO 99/56899 | 11/1999 |
| WO | 01/72456 | 10/2001 |
| WO | WO 02/09116 | 1/2002 |
| WO | WO 02/45198 | 6/2002 |
| WO | WO 02/073729 | 9/2002 |
| WO | WO 03/036739 | 5/2003 |
| WO | WO 03/069705 | 8/2003 |
| WO | WO 03/075382 | 9/2003 |
| WO | WO 03/105252 | 12/2003 |
| WO | WO 04/001885 | 12/2003 |
| WO | WO 2004/013925 | 2/2004 |
| WO | WO 2004/030130 | 4/2004 |
| WO | WO 2004/030133 | 4/2004 |
| WO | WO 2004/079033 | 9/2004 |
| WO | WO 2005/122300 | 12/2005 |
| WO | WO 2006/074932 | 7/2006 |
| WO | WO 2006/079558 | 8/2006 |
| WO | WO 2006/082057 | 8/2006 |
| WO | WO 2007/025762 | 3/2007 |

OTHER PUBLICATIONS

International Search Report and Written Opinion from International Searching Authority for PCT/EP2006/000229 dated Mar. 15, 2006 (9 pages).

International Search Report and Written Opinion from International Searching Authority for PCT/EP2006/000920 dated Sep. 22, 2006 (10 pages).

International Search Report and Written Opinion from International Searching Authority for PCT/EP2006/000813 dated Mar. 29, 2006 (10 pages).

International Preliminary Report on Patentability from International Searching Authority for PCT/EP2006/000813 dated May 18, 2007 (10 pages).

International Search Report and Written Opinion from International Searching Authority for PCT/DK2005/000379 dated Dec. 16, 2005 (14 pages).

United States Office Action for U.S. Appl. No. 11/814,356 dated May 1, 2008 (7 pages).

International Search Report from International Searching Authority for PCT/EP2006/008537 dated Aug. 8, 2007 (3 pages).

United States Office Action for U.S. Appl. No. 11/570,320 dated May 26, 2009 (15 pages).

Notice of Allowability with Office Action for U.S. Appl. No. 11/814,356 dated Jul. 6, 2009.

United States Office Action for U.S. Appl. No. 11/814,356 dated Jan. 26, 2009 (7 pages).

Donald, I.W. "Preparation, properties and chemistry of glass and glass-ceramic-to-metal seals and coatings," J. Mat. Sci. (1993) 28:2841-2886.

Dyck, C.R. et al., "Synthesis and characterization of $Gd_{(1-x)}Sr_xCoO_{(1-y)}Fe_yO_{(3-\delta)}$ as a cathode material for intermediate temperature solid oxide fuel cells," Mat. Res. Soc. Symp. Proc. (2004) 801:113-118.

Gut, B. et al., "Anode supported PEN for SOFC. Pressed substrates for spray pyrolysed and co-sintered electrolyte; redox stability and alternative anode," Jahresbericht (2001) 1-6.

Kim, J.H. et al., "Fabrication and characteristics of anode-supported flat-tube solid oxide fuel cell," J. Power Sources (2003) 122(2):138-143.

Klemensø, T. et al., "The mechanism behind redox instability of anodes in high-temperature SOFCs," Electrochemical Society Journal (2005) 152(11):A2186-A2192.

Matus, Y. et al., "Metal-supported solid oxide fuel cell membranes for rapid thermal cycling," Solid State Ionics (2005) 176:443-449.

Nadler, J.H. et al., "Oxide reduction and sintering of Fe-Cr alloy honeycombs," J. Mat. Research (2003) 18(8):1787-1794.

Xia, C. et al., "Functionally graded cathodes for honeycomb solid oxide fuel cells," Electrochem. Solid-State Letters (2002) 5(10):A217-A220.

Young, R.C. et al., "Symposium BB: Materials and Technologies for a Hydrogen Economy," Materials Research Society Symposium Proceedings Series (Nov. 30, 2003) pp. 709-717.

Zhang, Y. et al., "Redox cycling of Ni-YSZ anode investigated by TPR technique," Solid State Ionics (2005) 176:2193-2199.

International Search Report and Written Opinion from International Searching Authority for PCT/EP2005/013968 dated Mar. 28, 2006 (10 pages).

International Preliminary Report on Patentability from International Searching Authority for PCT/EP2005/013968 dated Mar. 30, 2007 (10 pages).

Han, M-F. et al., "Manufacturing processes of solid oxide fuel cell," China Academic Journal Electronic Publishing House (2001) 10:1195-1198.

United States Patent Office Action for U.S. Appl. No. 11/815,025 dated Jan. 26, 2011 (5 pages).

United States Patent Office Action for U.S. Appl. No. 11/815,025 dated May 26, 2010 (7 pages).

United States Patent Office Action for U.S. Appl. No. 11/813,798 dated Jun. 28, 2011 (9 pages).

United States Patent Office Action for U.S. Appl. No. 11/944,133 dated Jun. 22, 2011 (14 pages).

* cited by examiner

2A

2B

2C

2D 2E-1

2E-2

METHOD OF PRODUCING METAL TO GLASS, METAL TO METAL OR METAL TO CERAMIC CONNECTIONS

CROSS-REFERENCE TO RELATED APPLICATIONS

This patent application is a national stage filing under 35 U.S.C. 371 of International Application No. PCT/EP2005/013968, filed 23 Dec. 2005, which claims foreign priority to Denmark Patent Application No. PA 2004 02011, filed 28 Dec. 2004, the disclosures of which are incorporated by reference herein in their entireties. Priority to each application is hereby claimed.

The present invention relates to a method of producing metal to glass, metal to metal and metal to ceramic connections. Said connections may, for example, be used in solid oxide fuel cell (SOFC) applications.

Typically, SOFCs of the flat plate design comprise a stack of multiple cells, each of them comprising an electrolyte sandwiched by two electrodes. The electrodes of each cell are in contact with interconnect layers which make the series connection between the individual cells. Gas tight sealings are virtually important for the performance, durability and safely operation of a fuel cell.

Glasses are suitable as sealing materials for SOFCs since the physical and chemical properties of glasses can be tailored within a wide range. Different glass and glass-ceramic compositions have been examined within the group of alkali silicate, alkali aluminosilicates, alkaline earth silicates, alkaline earth aluminoborosilicates, phosphate and borosilicate glasses. However, even though promising results have been reported, none of them have been able to fulfill all the requirements of mechanical performance, e.g. viscosity and match of thermal expansion and chemical compatibility, e.g. wetting and bonding.

Composite seals with crystalline filler materials dispersed into base glass, e.g. alkali borosilicate glass, or in sodium aluminosilicate glass, have shown promising results in relation to exact matching the coefficient of thermal expansion (CTE) between the sealant and the seal surfaces. At the same time, suitable viscosities at the sealing temperature have been obtained.

However, an optimization of the bonding to metal surfaces is still required, and particularly a bonding to the corrosion scales formed on the metal surfaces as these depend on operation temperature, composition and microstructure of the pristine metals.

Bonding between the metal and a glass based seal has been demonstrated, cf. Yang, Z.; Coyle, C. A.; Baskaran, S.; Chick, L. A. "Making metal-to-metal and metal-to-ceramic interconnections for use in high temperature electrochemical devices by forming bond coat on first metal part, applying sealing material to bond coat, and adhering second part to sealing material" U.S. 2004060967-A 1, by forming a single element metallic bond coat (M=Fe, Ni or Co) or by the preferred solution where a composite bond coat phase (M-CrAlY) is applied to the metallic surface prior to adhering the seal and further elements. The alumina content of the bond coat, either stemming from the steel or from the bond coat, is claimed to be essential for the bond coat performance.

Oxides of the metallic elements themselves (V, Fe, Ni, Cu, Co and Mo) are well known constituents in the so-called ground coats when bonding vitreous enamels to ferrous alloys and are characterized by their ability to partially oxidize metallic Fe and form vitreous or mixed oxide phases, often characterized by dendrite formation at various oxidation states, cf. Donald, I. W., "*Preparation, properties and chemistry of glass and glass-ceramic-to-metal seals and coatings, J. Mat. Sci.* 28 (1993), p. 2841-86 and Eppler, R. A "*Glazes and glass coatings*", *The American Ceramic Society*, Westerville, Ohio (2000).

In view of the disadvantages of the prior art, it is the object of the present invention to provide metal to glass, metal to metal and metal to ceramic connections to be used in, for instance, SOFC applications, with which the boundary phases can be engineered so as to obtain a strong bond.

Said object is achieved by a method of manufacturing metal to glass, metal to metal, and metal to ceramic connections and which is able to engineer the boundary phases, so as to obtain a strong bond independent of the metal alloy composition and a protective oxidation scale developed during use characterized by said connections being produced to a desired layer thickness as a mixture of a base glass powder and a metal oxide powder, preferably of predetermined particle sizes and in a binder system, referred to as a glassy connection layer, the bonding being provided at elevated temperatures under controlled conditions, wherein the metal oxide powder is selected from the group consisting of:

0 to 10 wt % boron oxide with a grain size $d_{50}<2$ μm;
0 to 10 wt % magnesium oxide with a grain size $d_{50}<2$ μm;
0 to 8 wt % sodium and potassium oxides with a grain size $d_{50}<2$ μm;
1 to 10 wt % manganese oxide with a grain size $d_{50}<1.5$ μm;
1 to 10 wt % nickel oxide with a grain size $d_{50}<1.5$ μm;
0 to 10 wt % vanadium oxide with a grain size $d_{50}<1.5$ μm;
0 to 5 wt % cobalt oxide with a grain size $d_{50}<1.5$ μm; and
0 to 5 wt % molybdenum oxide with a grain size $d_{50}<1.5$ μm.
0 to 5 wt % copper oxide with a grain size $d_{50}<1.5$ μm.

Said object is moreover achieved by a method of manufacturing metal to glass, metal to metal, and metal to ceramic connections, characterized by said connections being produced with a mixture comprising a base glass powder and a metal oxide powder having a grain size of 5 μm or less.

Preferred embodiments are set forth in the subclaims.

The invention will be explained in the following with reference to the drawings wherein:

FIG. 1 illustrates the general concept and method.
FIG. 2A-2E illustrate the method of manufacturing the connections and specific embodiments of the method.
FIGS. 3A-3B illustrate a special embodiment of the method.

In the following, the invention will be described in more detail.

According to the invention the base glass powder is a glass matrix with a high coefficient of thermal expansion. The base glass powder is preferably selected from the group consisting of alkali aluminosilicates, (NAS), alkaline earth aluminoborosilicates, (CAS), and phosphate glasses, (MAP), to which metal oxides are added, e.g. magnesium oxide, in order to control the local wetting properties, henceforth referred to as a glassy connection layer.

Particularly high chemical stability and slow crystallization behavior have been reported in connection with the sodium aluminosilicates (NAS) glass, cf. Höland. W. and Beall, G., "*Glass-Ceramic Technology*", The American Ceramic Society, Westerville, Ohio (2002), and the residual vitreous glass has proved particularly beneficial in seal applications which may experience large thermal variations, e.g., rapid cycling between room temperature and operational temperatures close to the glass softening temperature.

Alkali alumosilicates, (NAS), suitable for the present invention comprise 10-25 mole % sodium oxide, 40-80 mole % silicon dioxide, 5-20 mole % aluminium oxide, and may optionally comprise 0-10 mole % boric oxide, 0-10 mole % magnesium oxide, 0-10 mole % calcium oxide, 0-10 mole % barium oxide, 0-2 mole % fluorine, and 0-5 mole % phosphor oxide.

Alkaline earth alumoborosilicates (CAS), suitable for the present invention comprise 40-80 mole % silicon dioxide, 5-20 mole % aluminium oxide, 20-45 mole % calcium oxide, and may optionally comprise 0-5 mole % sodium oxide, 0-10 mole % boric oxide, 0-10 mole % magnesium oxide, 0-2 mole % barium oxide, 0-2 mole % fluorine, and 0-5 mole % phosphor oxide.

Phosphate glasses (MAP) suitable for the present invention comprise 5-25 mole % aluminium oxide, 10-30 mole % magnesium oxide, 5-20 mole % calcium oxide, 40-60 mole % phosphor oxide and may optionally comprise 0-5 mole % sodium oxide, 0-12 mole % silicon dioxide, 0-10 mole % boric oxide, 0-5 mole % barium oxide, and 0-2 mole % fluorine.

Table 1 illustrates the compositional range for the base glasses used as defined above.

TABLE 1

| Mole % | "NAS" | "MAP" | "CAS" |
| --- | --- | --- | --- |
| Sodium oxide | 10-25 | 0-5 | 0-5 |
| Silicon dioxide | 40-80 | 0-12 | 40-70 |
| Aluminium oxide | 5-20 | 5-25 | 5-20 |
| Boric oxide | 0-10 | 0-10 | 0-10 |
| Magnesium oxide | 0-10 | 10-30 | 0-10 |
| Calcium oxide | 0-10 | 5-20 | 20-45 |
| Barium oxide | 0-10 | 0-5 | 0-02 |
| Fluorine | 0-2 | 0-2 | 0-2 |
| Phosphor oxide | 0-5 | 40-60 | 0-5 |

Interconnects develop a protective chromium-containing scale having a microstructure and composition which depend on the intrinsic alloy. In order to control the wetting and adhesion between the scale and the composite seal part, surface coatings are applied onto the interconnect which form strong and chemically compatible interfaces between the two components. Further, the inherent properties of the glass used in the composite seal parts have been altered locally at the metal-coat interface by addition of e.g. MgO, in order to control the viscosity and wetting, and at the same time maintain the bulk properties, e.g. high coefficient of thermal expansion of the base glass towards the seal components. The base glass composition has been selected so that a considerable amount of residual glass remains after bonding and partially crystallization of the glass composite seal and the glassy connection layer.

In the Figures, the reference character "a" designates a composite seal part; the reference character "b" designates a glassy connection layer; the reference character "c" designates a metallic material; the reference character "d" designates a metal coating; the reference character "e" designates a metal oxide coating; and the reference character "i" designates a tape cast foil.

The grain size of the base glass powder to be used in accordance with the present invention is preferably from 0.05 µm to 100 µm, more preferably from 0.05 µm to 50 µm, and most preferred from 0.05 µm to 30 µm.

The grain size of the metal oxide powder to be used with the base glass powder in accordance with the present invention is 5 µm or less, preferably from 0.05 µm to 5 µm, more preferably from 0.05 µm to 3 µm, and most preferred from 0.05 µm to 1.5 µm.

The bonding in accordance with the present invention is provided under elevated temperatures, depending on the specific components used, particularly the base glass powder. Preferred temperatures for the bonding are from 400° C. to 1100° C. It is also preferred to select the temperature to be from 200 to 400° C. above the glass transition temperature in question and even more preferred from 250 to 350° C. above the glass transition temperature in question.

The conditions for the bonding are controlled to achieve optimal bonding strength of the connections by firstly supplying air to the joint for oxidizing the organic binder during heat up through a temperature range from room temperature to 550° C. Secondly, at higher temperatures an orthogonal sealing pressure, typically between 0.1 kPa and 1000 kPa and preferably between 10 kPa and 400 kPa is applied and held constant during the bonding process, which typically lasts from 0.1 to 10 hours.

Preferably, prior to applying the base glass powder together with the metal oxide on the metal surface, the metal surface is coated with a metallic coating. Said coating may be alloyed into the surface by heating to high temperature, preferably between 750 to 950° C. for relatively short time, preferably 0.5 to 5 hours in a controlled atmosphere, where the oxygen and nitrogen partial pressures are held lower than $\sim 10^{-20}$ bar.

Alternatively, a transition-metal oxide coating may be applied to the metal surface by spraying or dip-coating prior to the application of the base glass powder and the metal oxide.

The combined action of transition metal oxides, in particular cobalt-, nickel-, and manganese oxide, which are preferably applied as a surface coating on the metal, together with the glassy connection layer, encompasses a tunable base coat, which is used for instance in a SOFC environment for providing a strong bonding component between the metal parts and the neighbor components in form of glassy composite seal parts, other metal parts or ceramic parts. The transition metal oxides may also be added to the glass in smaller amounts.

Specific connections are produced by coating a composite seal part with a dispersed metal oxide suspension. This may be carried out by, for example, dip coating or spraying.

Examples of the metal oxides to be added to the base glass powder in order to control the glass wetting properties are boron oxide, magnesium oxide, sodium oxide, potassium oxide and vanadium oxide, with boron oxide, magnesium oxide and sodium oxide being particularly preferred. Examples of the metal oxides to be added to the base glass powder or preferably as a surface coat on the metallic part in order to control the glass bonding and adhesion properties are manganese oxide, nickel oxide, cobalt oxide, molybdenum oxide, copper oxide or mixtures thereof. Preferred oxides are manganese oxide, nickel oxide, and cobalt oxide, with nickel oxide and cobalt oxide being particularly preferred.

Furthermore, in a preferred embodiment the connections are produced as a mixture of a base glass powder and a metal oxide powder in a binder system.

The invention will in the following be illustrated with reference to the detailed examples which are however not limiting the invention.

EXAMPLES

Metallic materials have been divided into three groups; one which develops a duplex seal of chromia and Cr—Mn-spinel (exemplified by Krupp-Thyssen, Crofer 22APU), a second which develops a single layer scale of chromia (exemplified by Sandvik 0YC44), and a third which develops a protective alumina scale (exemplified by Fe Cr alloy). Interconnect materials of ferritic chromium steel were cut to shape before treated with surface coatings. In case of metallic coatings, except for nickel, the surface oxides on the interconnect metal were removed prior to coating by rinsing specimens in a ultrasonic aqueous $HF/HNO_3$-bath, followed by a rinse in ethanol and finally dried at 60° C. in air. Other coatings were applied after degreasing the metal surface in acetone and drying at 60° C. in air.

Glass Sample Mixtures:

Silicate glass samples were produced by melting analytical grade chemicals $Na_2CO_3$, $SiO_2$, $Al_2O_3$, $B_2O_3$, MgO, NaF, and $CaCO_2$ in a platinum crucible at 1500° C. for 4 hr. The glass was quenched, crushed, re-melted and final milled into powder (d50<5 μm, as measured by a Beckman coulter I/S particle size analyser). Phosphate glasses were prepared by mixing analytical grade $MgHPO_4(3H_2O)$, $Al(PO_3)_3$, $H_3BO_3$ and $SiO_2$ by ball milling, melting in alumina crucibles at 1500° C. for 30 minutes while stirring before quenching, crushing and final milling into powder (d50<5 μm). Thin films having a dried thickness of 5-45 μm were made by screen-printing of glass powder or mixtures of glass powder and metal oxide powders. Glass foils, typically in the range of 200-400 μm were made by tape casting of glass powder or mixtures of glass powder and metal oxide powder. Large bodies of glass composite sealing, for which the CTE was matched to the CTE of the steels, were prepared from MgO powder (d=90-200 μm) or metal powder (Fe Cr alloy, d=10-200 μm) mixed in a ball mill with glass powder for 18 h before filled into graphite moulds and sintered at 750° C. for 2 h at a $pO_2 < 3 \cdot 10^{-9}$ atm. The sintered seals were finally machined to obtain parallel, smooth surfaces. Three prepared base glass samples are illustrated in table 2.

Table 2 illustrates the three prepared base glass samples.

TABLE 2

| Mole % | Glass No 1 ("NAS") | Glass No 2 ("MAP") | Glass No 3 ("CAS") |
|---|---|---|---|
| Sodium oxide | 17.8 | — | 0.5 |
| Silicon dioxide | 72.8 | 8.0 | 39.4 |
| Aluminium oxide | 9.4 | 15.0 | 10.1 |
| Boric oxide | — | 2.0 | 4.5 |
| Magnesium oxide | — | 30.0 | 4.6 |
| Calcium oxide | — | — | 40.1 |
| Fluorine | — | — | 0.8 |
| Phosphor oxide | — | 55.0 | — |

Example 1

A Crofer 22APU (c) was coated with a 15 μm thick layer of glass No 3/MgO/$CO_3O_4$ (4 wt % MgO, 0.5 wt % $CO_3O_4$) glassy connection layer by screen-printing, (b) in FIG. 2A. Glass No 3 was prepared and combined with 72 wt % metal powder (Fe Cr alloy, 90 μm<d<120 μm) for the composite seal part (a). Metal and composite seal were held together by 400 kPa during heating to 9500 for 4 h before cooling to 750° C., where the connection was aged for 500 h before being thermally cycled twice to room temperature.

Example 2

A Sandvik 0YC44 (c) was coated with nominally 0.1 μm metallic nickel (d) and by screen-printing coated with a 45 μm thick layer of glass No 1/MgO glassy connection layer (2 wt % MgO, d<1.1 μm (b), cf. FIG. 2B). Glass No 1 was prepared and combined with 55 wt % coarse MgO for the composite seal part (a). Metal and composite seal were held together by 400 kPa during heating to 9500 for 4 h before cooling to 750° C. in an argon/hydrogen mixture, where the connection was aged for 500 h before being thermally cycled twice to room temperature.

Example 3

A Sandvik 0YC44 (c) was coated with nominally 0.1 μm Mn-metal (d) and preheated in argon ($pO_2 < 10^{-20}$ atm.) to alloy the coating into the surface and after cooling to room temperature coated with a 15 μm thick layer of glass No 3/MgO/NaO glassy connection layer (10 wt % MgO, d<1.3 μm; 1 wt % $Na_2O$, (d<2 μm) by screen printing (b), cf. FIG. 2B. Glass No 3 was prepared and combined with 79 wt % metal powder (SS316) for the composite seal part (a). Metal and composite seal were held together by 400 kPa during heating to 950° for 4 h before cooling to 750° C. in an argon/hydrogen mixture, where the connection was aged for 500 h before being thermally cycled twice to room temperature.

Example 4

A Crofer 22 APU (c) was coated with metallic cobalt (d), cf. FIG. 2B, preheated at 900° C. for 2 h in argon ($pO_2 < 10^{-20}$ atm.) to alloy the coating into the surface and after cooling to room temperature coated with a thin thick layer of glass No 1/MgO glassy connection layer (20 wt % MgO) by screen printing (b). Glass No 1 was prepared and combined with 55 wt % coarse MgO for the composite seal part (a). Metal and composite seal were heated to 400° C. in air and then held together by 400 kPa during heating to 950° for 4 h and cooling to 750° in an argon/hydrogen mixture, where the connection was aged for 500 h before being thermally cycled twice to room temperature.

Example 5

A Sandvik 0YC44 (c) was coated with Mn-metal and preheated (d) at 850° C. for 0.5 h in argon ($pO_2 < 10^{-20}$ atm.) to alloy the coating into the surface and after cooling to room temperature coated with a 45 μm thick layer of glass No 1/MgO glassy connection layer (2 wt % MgO) by screen printing, (b) in FIG. 2B. Glass No 1 was prepared and combined with 55 wt % coarse MgO for the composite seal part (a). Metal and composite seal were heated to 400° C. in air and then held together by 400 kPa during heating to 750° for 4 h before cooling to 550° C., where the connection was aged for 500 h before being thermal cycled twice to room temperature.

Example 6

A Crofer 22 APU (c) was coated with a 5 μm thick layer of cobalt oxide (e) and then coated with a 15 μm thick layer of glass No 1/MgO glassy connection layer (5 wt % MgO) by screen-printing (b), cf. FIG. 2C. Glass No 1 was prepared and combined with 55 wt % coarse MgO for the composite seal part (a). Metal and composite seal were heated to 400° C. in air and then held together by 400 kPa during heating to 950° for 4 h before cooling to 750° C., where the connection was aged for 500 h before being thermally cycled twice to room temperature.

Example 7

A Sandvik 0YC44 (c) was coated with Mn-metal, (d) in FIG. 2D and preheated at 850° C. for 0.5 h in argon ($pO_2 < 10^{-20}$ atm.) to ally the coating into the surface. The metal was then slurry coated with a 10 μm thick cobalt oxide (e). preheated in air to 500° C. for 0.5 h to alloy and oxidize the coating and after cooling to room temperature coated with 45 μm thick layer of glass No 1/MgO/$B_2O_3$ glassy connection layer (2 wt % MgO, d<1.1 μm, 4 wt % $B_2O_3$, d<0.8 μm) by screen printing (b). Glass No 1 was prepared and combined with 55 wt % coarse MgO for the composite seal part (a). Metal and composite seal were held together by 400 kPa during heating to 880° C. for 4 h before cooling to 750° C., where the connection was aged for 500 h before being thermally cycled twice to room temperature.

Example 8

A Sandvik 0YC44 (c) was coated with nominally 0.1 μm metallic nickel, (d) In FIG. 2B and by screen-printing coated with a 45 m thick layer of glass No 3/MgO/$Na_2O$ (10 wt % MgO, 2 wt % $Na_2O$) glassy connection layer (b). Glass No 3 was prepared and combined with 70 vol % metal powder (SS316, 50 μm<d<140 μm) for the composite seal part (a). Metal and composite seal were held together by 400 kPa during heating to 950° C. for 4 h in air before cooling to 750° C. in an argon/hydrogen mixture, where the connection was aged for 500 h before being thermally cycled twice to room temperature.

Example 9

A Sandvik 0YC44 (c) was spray-coated with nominally 10 μm layer of nickel oxide (d 25<1.5 μm) (e) dispersed in a binder system, dried and coated with a 45 μm thick layer of glass No 3/MgO/NaO glassy connection layer (3 wt % MgO; 4 wt % NaO) by screen printing. (b), cf. FIG. 3 A. Magnesium aluminate spinel ceramic was cut to rectangular shape and ground to obtain plane parallel surfaces a. Metal and ceramic parts were held together by 400 kPa during heating to 950° C. for 4 h before cooling to 750° C. in an argon/hydrogen mixture, where the connection was aged for 500 h before being thermally cycled twice to room temperature.

Example 10

A glass No 1, cf. table 2, was prepared and combined with 55 wt % coarse MgO (a) in FIG. 2E-1. The powders were mixed with an organic vehicle (paraffin dissolved in EtOH) and composite seal parts made by uniaxial pressing. Magnesium manganese spinel ($MgMn_2O_4$) powder ($d_{50}=2$ μm) was dispersed and mixed with an organic vehicle. The composite seal parts were subsequently coated with the spinel-slurry by dip-coating (e). Crofer 22APU (c) and the coated seal pan were held together by approximately 10 kPa and heated to 900° C. where the load was increased to 40 kPa while keeping the temperature. After 2 h the temperature was reduced to 750° C., where the connection was aged for 500 h before being thermally cycled twice to room temperature.

Example 11

Figure 2:
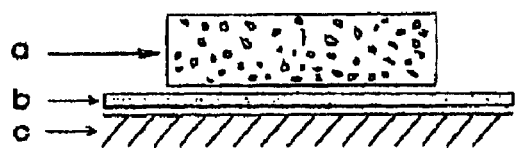
Figure 2:
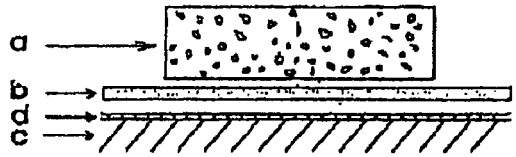
Figure 2:
Figure 2:
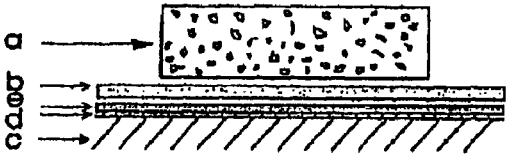
Figure 2:
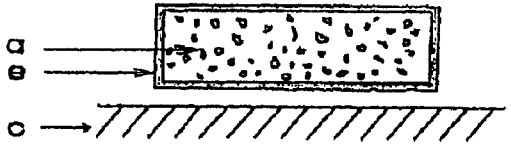
Figure 2:
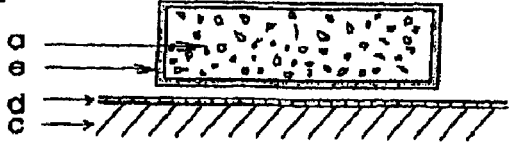
Figure 3:
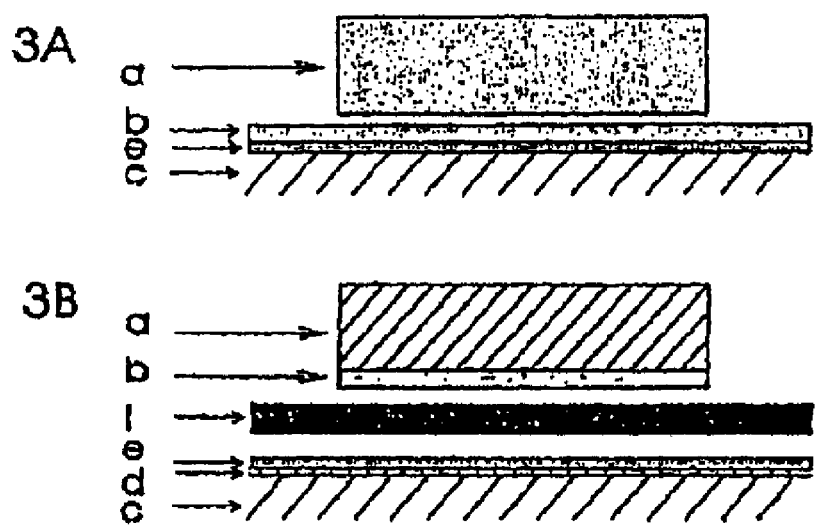

A glass No 1, cf. table 2, was prepared and combined with 55 wt % coarse MgO (a) in FIG. 2E-2, The powders were mixed with an organic vehicle (paraffin dissolved in EtOH) and composite seal parts made by uniaxial pressing. Magnesium manganese spinel ($MgMn_2O_4$) powder ($d_{50}=2$ μm) was dispersed and mixed with an organic vehicle. The composite seal parts were subsequently coated with the spinel-slurry by dip-coating (e). A Crofer 22APU (c) was coated with metallic cobalt (25 μm/cm²) (d) and preheated at 900° C. for 2 h in argon ($pO_2 < 10^{-20}$ atm.) to alloy the coating into the surface. After cooling to room temperature, the metal and the coated seal part were held together by approximately 10 kPa and heated to 900° C., where the load was increased to 40 kPa while keeping the temperature. After 2 h the temperature was reduced to 750° C., where the connection was aged for 500 h before being thermally cycled twice to room temperature.

Example 12

A Sandvik 0YC44 (c) was coated with nominally 0.1 μm metallic nickel, (d) in FIG. 3B and by screen-printing coated with a 5 μm thick layer of cobalt oxide (e). Crofer 22APU (a) was coated with a 15 μm thick layer of glass No 3/MgO/$CO_3O_4$ glassy connection layer by screen-printing (b). A 200 μm, thick tape cast foil (i) of glass No 5 3/MgO/$Na_2O$/CaO glassy connection layer was sandwiched in between these two metal parts. The compound was held together by 400 kPa during heating to 750° C. for 4 h in air before cooling to 550° C., where the connection was aged for 500 h before being thermally cycled twice to room temperature.

Example 13

A Crofer 22APU (c) in FIG. 2A was coated with a 15 μm thick layer of glass No 2/$CO_3O_4$ glassy connection layer (5 wt % $CO_3O_4$, d<1.5 μm) by screen-printing (b). Glass No 2 was prepared and combined with 79 wt % metal powder (0YC44) for the composite seal part (a). Metal and composite seal were held together by 200 kPa during heating to 700° C. for 4 h before cooling to 550° C., where the connection was aged for 500 h before being thermally cycled twice to room temperature.

Example 14

A Sandvik 0YC44 (c) was coated with Mn-metal, (d) m FIG. 2D and preheated at 850° C. for 0.5 h in argon/hydrogen ($pO_2 < 10^{-20}$ atm.) to alloy the coating into the surface. The metal was then slurry coated with a 10 μm thick cobalt oxide layer (e), preheated in air to 800° C. for 0.5 h to alloy and oxidize the coating, and after cooling to room temperature coated with 45 m thick layer of glass No 2/MgO (2 wt % MgO) glassy connection layer by screen printing (b). Glass No 2 was prepared and combined with 55 wt % coarse MgO for the composite seal part (a). Metal and composite seal were held together by 100 kPa during heating to 700° C. for 4 h before cooling to 550° C., where the connection was aged for 500 h before being thermally cycled twice to room temperature.

It should be apparent to those skilled in the art that various changes in form and detail of the invention as shown and described above may be made. It is intended that such changes be included within the spirit and scope of the claims appended hereto.

The invention claimed is:
1. A method of manufacturing metal to glass, metal to metal, and metal to ceramic connections, the method comprising
producing said connections to a desired thickness as a
glassy connection layer comprising a mixture of a base glass powder and a metal oxide powder, wherein bonding is provided at elevated temperatures under controlled conditions, and wherein the metal oxide powder is selected from the group consisting of:
0 to 10 wt % boron oxide with a grain size $d_{50}<2$ μm;
0 to 10 wt % magnesium oxide with a grain size $d_{50}<2$ μm;
0 to 8 wt % sodium and potassium oxides with a grain size $d_{50}<2$ μm;
1 to 10 wt % manganese oxide with a grain size $d_{50}<1.5$ μm;
1 to 10 wt % nickel oxide with a grain size $d_{50}<1.5$ μm;
0 to 10 wt % vanadium oxide with a grain size $d_{50}<1.5$ μm;
0 to 5 wt % cobalt oxide with a grain size $d_{50}<1.5$ μm;
0 to 5 wt % molybdenum oxide with a grain size $d_{50}<1.5$ μm; and
0 to 5 wt % copper oxide with a grain size $d_{50}<1.5$ μm;

coating a metal surface with a metallic coating or a transition-metal oxide coating to provide a coated metal surface, wherein the coated metal surface faces the glassy connection layer; and then applying the base-glass powder together with the metal oxide on the coated metal surface.

2. The method according to dam 1, further comprising producing said connections as a base glass powder with addition of metal oxide powders in a binder system being combined with the metallic coating on the metal surface, said coating being alloyed into the surface by heating in a controlled atmosphere prior to application of the glassy connection layer.

3. The method according to dam 1, further comprising producing said connections as a base glass powder with addition of metal oxide powders in a binder system being combined with metal oxide coatings on the metal surface, said coatings being deposited prior to application of the glassy connection layer.

4. The method according to claim 1, further comprising producing said connections as a base glass powder with additions of the metal oxide powders in a binder system and being combined with the metallic coatings on the metal surface, which are alloyed into the surface by heating in a controlled atmosphere prior to application of a metal oxide coating on the metal surface, said coating being deposited prior to bringing together the metal and the glassy connection layer.

5. The method according to claim 1, further comprising producing said connections by coating a composite seal part with a dispersed metal oxide suspension.

6. The method according to claim 1, further comprising producing said connections by coating a composite seal part with a dispersed metal oxide suspension in combination with the metal coating on the metal surface which is alloyed into the surface by heating in a controlled atmosphere prior to bringing together the metal and the seal composite components.

7. The method according to claim 1, wherein the amount of glassy connection layer per surface area being sufficient to dissolve any protective chromia scale which may develop on the metallic parts.

8. The method according to claim 1, wherein the base glass is selected from glasses of earth alkaline aluminosilicates at compositions resulting in eutectic crystallization behavior, or from sodium aluminosilicates at compositions within the primary crystallization field of Albeit, or from magnesium aluminophosphate glasses.

9. The method according to claim 1, wherein the metal coatings are oxidized in situ after application and control the scale composition on the metallic part, said metallic surface being selected from the following:
Manganese, nickel, and cobalt.

10. The method according to claim 9, wherein said metallic surface is selected from the following:
<80 μg/cm² manganese;
<90 μg/cm² nickel, and
<40 μg/cm² cobalt.

11. The method according to claim 1, further comprising using a base glass with a slow or eutectic crystallization behavior in order to maintain a compliant seal at operating temperatures higher than the glass softening temperature.

12. The method according to claim 10, further comprising adding high expansion material to said base glass in order to adapt the thermal expansion of the seal composite material to the thermal expansion of the surface.

13. The method according to claim 12, wherein said high expansion material is fine grained enough so as to prevent excessive micro cracking of the seal, and coarse enough so as to prevent excessive reaction and dissolution into the glass matrix.

14. The method according to claim 12, wherein said high expansion material has a grain size of d=10-200 μm.

15. A method for bonding metal to glass composite, bonding metal to ceramic components or bonding metal to metal components, the method comprising bonding metal to glass composite, bonding metal to ceramic components or bonding metal to metal components using the connections of claim 1.

16. A method of manufacturing metal to glass, metal to metal, and metal to ceramic connections,
comprising producing said connections with a mixture comprising a base glass powder and a metal oxide powder having a grain size of 5 μm or less,
coating a metal surface with a metallic coating or a transition-metal oxide coating to provide a coated metal surface, wherein the coated metal surface faces the glassy connection layer; and
then applying the base-glass powder together with the metal oxide on the coated metal surface.

* * * * *